US008284764B1

(12) United States Patent
Nucci et al.

(10) Patent No.: US 8,284,764 B1
(45) Date of Patent: Oct. 9, 2012

(54) VOIP TRAFFIC BEHAVIOR PROFILING METHOD (75) Inventors: Antonio Nucci, San Jose, CA (US); Supranamaya Ranjan, Albany, CA (US); Ram Keralapura, Santa Clara, CA (US)

(73) Assignee: Narus, Inc., Sunnyvale, CA (US)

( * ) Notice: Subject to any disclaimer, the term of this patent is extended or adjusted under 35 U.S.C. 154(b) by 950 days.

(21) Appl. No.: 12/334,926

(22) Filed: Dec. 15, 2008

(51) Int. Cl.
*H04L 12/66* (2006.01)

(52) U.S. Cl. .......................................... 370/352

(58) Field of Classification Search .................. 370/352, 370/232, 237, 230, 230.1, 235, 229, 389, 370/471, 392, 400, 401, 395.52
See application file for complete search history.

(56) References Cited

U.S. PATENT DOCUMENTS

| 5,835,490 | A | 11/1998 | Park et al. | |
|---|---|---|---|---|
| 6,944,673 | B2 * | 9/2005 | Malan et al. | 709/237 |
| 7,441,429 | B1 * | 10/2008 | Nucci et al. | 70/229 |
| 7,886,358 | B2 * | 2/2011 | Copeland, III | 726/23 |
| 2006/0087973 | A1 | 4/2006 | Huang | |
| 2007/0206579 | A1 | 9/2007 | Voith et al. | |
| 2007/0233896 | A1 | 10/2007 | Hilt et al. | |
| 2007/0255828 | A1 | 11/2007 | Paradise | |
| 2008/0016157 | A1 | 1/2008 | Sahraie et al. | |

OTHER PUBLICATIONS

Dantu, R. and Kolan, P. Detecting Spam in VoIP networks. Proceedings of USENIX, SRUTI '05: Steps for Reducing Unwanted Traffic on the Internet Workshop [online], Jul. 7, 2005 [retrieved on Aug. 28, 2009]. Retrieved from the Internet: <http://www.usenix.org/event/sruti05/tech/full_papers/dantu/dantu.pdf>, pp. 31-37.

Geneiatakis, D., et al. Novel Protecting Mechanism for SIP-Based Infrastructure against Malformed Message Attacks: Performance Evaluation Study. Proc. of the 5th International Conference on Communication Systems, Networks and Digital Signal Processing (CSNDSP'06) [online], Jul. 2006 [retrieved on Aug. 28, 2009]. Ret. from: <http://www.wcl.ee.upatras.gr/csndsp/CD/contents/Sessions/Presentations/A12 %20-%20Internet%20atacks%20-anomaly%20detection/A12.4.PDF>, p. 261.

Geneiatakis, D., et al., "SIP Message Tampering: TheSQL Code Injection Attack," in: Proc. of the 13th IEEE International Conference on Software, Telecommunications and Computer Networks (SoftCOM 2005) (Split, Croatia, Sep. 2005), pp. 176-181.

(Continued)

*Primary Examiner* — Chi Pham
*Assistant Examiner* — Alexander O Boakye
(74) *Attorney, Agent, or Firm* — Fernandez & Associates, LLP (57) ABSTRACT The invention relates to a method for profiling VoIP activity in network traffic. The method includes obtaining a plurality of audio packets from a plurality of packets in the network traffic by analyzing a plurality of parameter sets based on a first pre-determined criterion, wherein each of the plurality of parameter sets corresponds to a packet of the plurality of packets and comprises a packet size and a packet arrival time associated with a corresponding packet of the plurality of packets, generating a count of an IP address by counting at least a portion of the plurality of audio packets, wherein each packet of the portion of the plurality of audio packets comprises the IP address, and identifying an endpoint corresponding to the IP address as a VoIP server and identifying the portion of the plurality of audio packets as VoIP activity associated with the VoIP server when the count exceeds a pre-determined threshold.

34 Claims, 4 Drawing Sheets

OTHER PUBLICATIONS

Hickey, A.R., for VoIP, too many threats to count. SearchSecurity.com: Information Security News [online], Dec. 15, 2005 [retrieved on Dec. 21, 2006]. Retrieved from the Internet: <http://searchsecurity.techtarget.com/originalContent/0,289142,sid14_gci1153718,00.html?SEevlg65>.

McGann, S. and Sicker, D.C. "An Analysis of Security Threats and Tools in SIP-Based VoIP Systems." in: 2nd Workshop on Securing Voice over IP (Washington DC, Jun. 1, 2005).

Reynolds, B. and Ghosal, D. Secure IP Telephony using Multi-Layered Protection. Proceedings of Network and Distributed System Security Symposium (NDSS'03) [online], Feb. 2003 [retrieved on Aug. 28, 2009]. Retrieved from the Internet: <http://www.isoc.org/isoc/conferences/ndss/03/proceedings/papers/3.pdf>.

Reynolds, B. et al., "Vulnerability Analysis and A Security Architecture for IP Telephony," in: IEEE GlobeCom Workshop on VoIP Security: Challenges and Solutions (Dallas TX, Dec. 3, 2004).

Rosenberg, J., et al. SIP: Session Initiation Protocol. Internet Engineering Task Force (IETF) RFC 3261 [online], Jun. 2002 [retrieved on Aug. 28, 2009]. Retrieved from the Internet: <www.ietf.org/rfc/rfc3261.txt>.

Wu, Y.S., et al, "SCIDIVE: A Stateful and Cross Protocol Intrusion Detection Architecture for Voice-over-IP Environments,"in: Proceedings of the 2004 International Conference on Dependable Systems and Networks (DSN'04) (Split, Croatia, Jun. 2004), pp. 433-442.

Wosnack, N. A Vonage VoIP 3-way call CID Spoofing Vulnerability. Hack Canada [online], Aug. 13, 2003 [retrieved on Aug. 28, 2009]. Retrieved from the Internet: <www.hackcanada.com/canadian/phreaking/voip-vonage-vulnerability.html>.

Pesch, D., et al.,"Performance evaluation of SIP-based multimedia services in UMTS," Computer Networks: The International Journal of Computer and Telecommunications Networking vol. 49, No. 3, (Oct. 19, 2005), pp. 385-403.

Kang, H. J. et al., "SIP-based VoIP Traffic Behavior Profiling and Its Applications," in: Proceedings of the 3rd annual ACM Workshop on Mining Network Data (San Diego CA, Jun. 12, 2007), pp. 39-44.

U.S. Appl. No. 12/210,029, filed Sep. 12, 2008, Nucci, et al.

U.S. Appl. No. 12/268,678, filed Nov. 11, 2008, Nucci, et al.

* cited by examiner

VOIP TRAFFIC BEHAVIOR PROFILING METHOD

CROSS REFERENCE TO RELATED APPLICATIONS

This application is related to U.S. patent application Ser. No. 11/540,893 filed Sep. 28, 2006 and entitled "SIP-based VoIP Traffic Behavior Profiling Method," U.S. patent application Ser. No. 11/644,419 filed Dec. 22, 2006 and entitled "Method for Real Time Network Traffic Classification," and U.S. patent application Ser. No. 12/104,723 filed Apr. 17, 2006 and entitled "System and Method for Internet Endpoint Profiling" all of which are incorporated herein by reference.

BACKGROUND

1. Field

The present invention relates to computers and computer networks. More particularly, the present invention relates to Voice over IP (VoIP) traffic behavior profiling method.

2. Description of Related Art

Voice over IP (VoIP) allows users to make phone calls over the Internet, or any other IP network, using the packet switched network as a transmission medium rather than the traditional circuit transmissions of the Public Switched Telephone Network (PSTN). VoIP has come a long way since its first rudimentary applications provided erratic yet free phone calls over the unmanaged Internet. VoIP technology has reached a point of being comparable in terms of grade voice quality with traditional PSTN yet consuming only a fraction of the bandwidth required by TDM networks. The maturity of VoIP standards and quality of service (QoS) on IP networks opens up new possibilities for carrier applications. Consolidation of voice and data on one network maximizes network efficiency, streamlines the network architecture, reduce capital and operational costs, and opens up new service opportunities. At the same time, VoIP enables new multimedia service opportunities, such as Web-enabled multimedia conferencing, unified messaging, etc, while being much cheaper.

VoIP offers compelling advantages but it also presents a security paradox. The very openness and ubiquity that make IP networks such powerful infrastructures also make them a liability. Risks include Denial of Service (DoS), Service Theft, Unauthorized Call Monitoring, Call Routing Manipulation, Identity Theft and Impersonation, among others. Not only does VoIP inherit all data security risks, but it introduces new vehicles for threats related to the plethora of new emerging VoIP protocols that have yet to undergo detailed security analysis and scrutiny. But just how serious are the threats posed to VoIP? Recently, there have been a string of attacks against either the VoIP infrastructure or end users. In one such incident, early June of 2006, two men were arrested for fraudulently routing approximately $500,000 worth of calls illegally over the VoIP network belonging to Net2Phone, a Newark, N.J., VoIP provider. Fifteen Internet phone companies were reported as the victims of this attack. More recently, ISS posted a report about a Denial-of-Service vulnerability in the IAX2 implementation of Asterisk, an open source software PBX. This vulnerability relates to the amount of time that a pending (but not yet authenticated) call is allowed to exist in memory on the server. New terms start to be coined over time just for VoIP attacks; "Vishing", is now used for phishing attacks using VoIP technology, or "Spit", now used for spam over VoIP. Hence it is imperative for Service Providers to widely deploy scalable monitoring systems with powerful tools across their entire infrastructures such as to robustly shield their VoIP infrastructure and protect their service. Passive packet monitoring and capturing devices may be deployed in the underlying network hosting VoIP services, for example to capture the standard layer-3 (IP) and layer-4 (TCP/UDP) header information in well known layered network data models.

SUMMARY OF THE INVENTION

The invention relates to a method for profiling VoIP activity in network traffic. The method includes obtaining a plurality of audio packets from a plurality of packets in the network traffic by analyzing a plurality of parameter sets based on a first pre-determined criterion, wherein each of the plurality of parameter sets corresponds to a packet of the plurality of packets and comprises a packet size and a packet arrival time associated with a corresponding packet of the plurality of packets, generating a count of an IP address by counting at least a portion of the plurality of audio packets, wherein each packet of the portion of the plurality of audio packets comprises the IP address, and identifying an endpoint corresponding to the IP address as a VoIP server and identifying the portion of the plurality of audio packets as VoIP activity associated with the VoIP server when the count exceeds a pre-determined threshold.

BRIEF DESCRIPTION OF DRAWINGS

So that the manner in which the above recited features, advantages and objects of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTIONS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. In other instances, well-known features have not been described in detail to avoid obscuring the invention.

Generally speaking, the invention utilizes standard layer-3 (IP) and layer-4 (TCP/UDP) header information to identify VoIP servers, VoIP activities, VoIP applications, and anomalies with associated causes in network traffic.

A network traffic flow (i.e., the packets flowing from source nodes to destination nodes in a network) may be classified into multiple classifications, e.g., types or categories such as AUDIO (e.g., VoIP traffic flow), VIDEO (e.g., video conference traffic flow), FILE (e.g., file transfer traffic flow), UNKNOWN (e.g., unknown traffic flow), or other categories. Here a flow may be uniquely determined by 5 tuples in Transmission Control Protocol (TCP) and User Datagram Protocol (UDP), i.e., source IP address, destination IP address, source port, destination port, and protocol number. However, this classification scheme may be inappropriate because of the trend for session layer to reuse transport layer resources. For example, Skype, a proprietary peer-to-peer VoIP network, may be used by two users to communicate with each other while they may talk, type instant messages (IM), and transfer files at the same time. Skype may transmit different types of traffic over the same transport layer connection. Other applications such as MSN messenger (MSN), Google Talk (GTalk), or other instant messaging application may also allow session layer to reuse transport layer resources. In these examples, a network traffic flow may carry multiple types of traffic and may be referred to as "hybrid flow".

A network traffic flow may be modeled by as a stochastic process. For example, the network traffic flow may be defined as a set of data packets, each data packet being represented by data packet features, such as packet size and packet arrival time. Thus, a network traffic flow may be represented by $$F=\{(P_i, A_i): i=1, \ldots, I\}$$

where $P_i$ and $A_i$ denote the packet size and relative packet arrival time, respectively, of the nil packet in the flow with total number of I packets. In one example, only relative arrival time may be considered in which case $A_1$ arrival is always 0. In other examples, there may be different number of data packet features and the data packet features may be different than described above.

Figure 1:
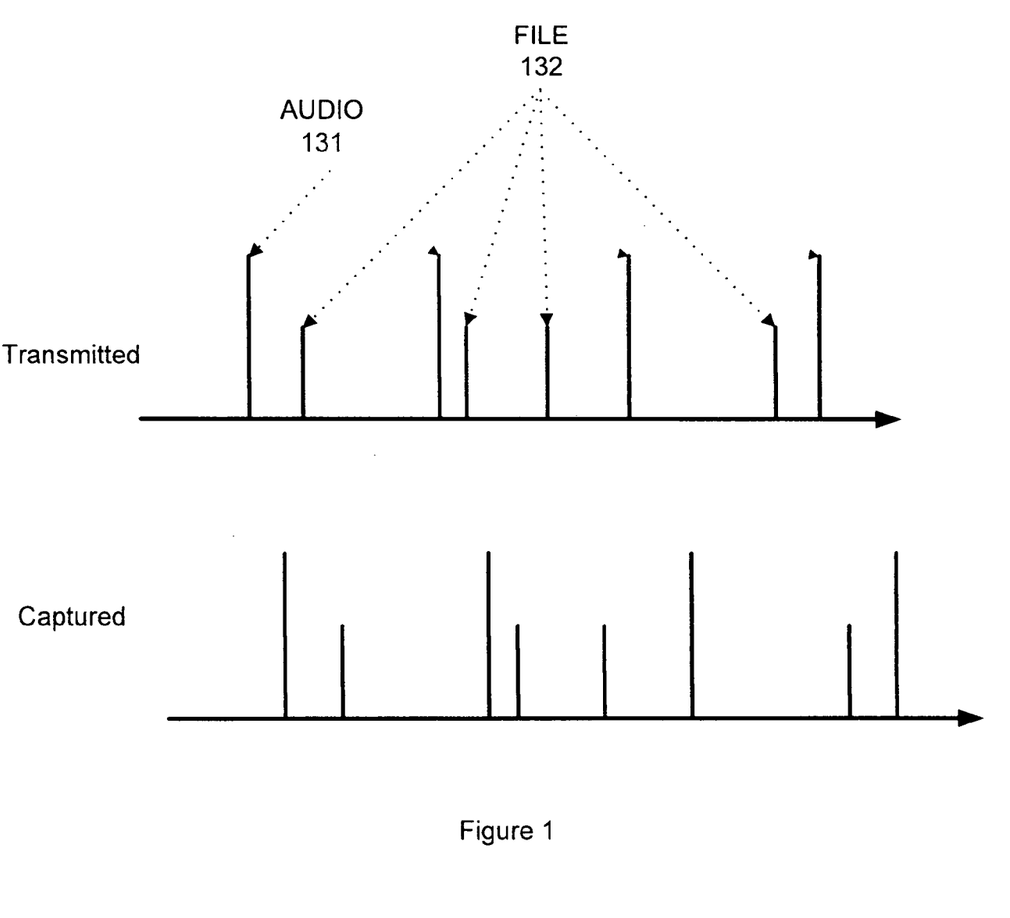
FIG. 1 shows an example network traffic flow in accordance with one embodiment of the invention.

FIG. 1 shows an example network traffic flow in accordance with one embodiment of the invention. FIG. 1 depicts a scenario when a network traffic flow carries multiple sessions, such as a VoIP session including AUDIO packets (131) and a file transfer session including FILE packets (132). Generally speaking, a VoIP session refers to a collection of packets involved in multi-party (or user) voice communication using a VoIP application. Throughout this document, the term "VoIP activity" refers to audio packets in the network traffic, which may be a portion of a VoIP session, VoIP sessions associated with one VoIP server, VoIP sessions associated with multiple VoIP servers using different VoIP applications, or any other set or sets of audio packets depending on the context. At the transmission side in the scenario of FIG. 1, AUDIO packets (131) are transmitted periodically whereas FILE packets (132) are transmitted more randomly. As shown in FIG. 1 when the flow is captured, the high regularity of AUDIO packet arrival events still maintains, although packets of two sessions (131) and (132) are interleaved in the horizontal time scale with each other. U.S. patent application Ser. No. 11/644,419 entitled "Method for Real Time Network Traffic Classification" describes a method to classify audio traffic flows (e.g., AUDIO packets (131)) by identifying regularities in network traffic flows.

As described in U.S. patent application Ser. No. 11/644,419 entitled "Method for Real Time Network Traffic Classification," a FILE traffic flow (i.e., file transfer traffic flow) may be composed of equal-sized packets, except for the last packet, whose size is usually smaller because file size may not be a multiple of segment size. Secondly, packet size of FILE traffic flow is larger than that of AUDIO or VIDEO traffic flow. The larger the file segment is, the fewer the number of packets may be required to transmit a file, which translates to less overhead contributed by packet header. To avoid fragmentation, software developers may also want to choose packet size smaller than maximum transmission unit (MTU). The most common MTU value of Ethernet, and hence the majority of the Internet, is 1500 bytes. As a result, packet size of FILE traffic flow may commonly be chosen to be close to 1500 bytes. For example, Skype uses 1397 bytes and MSN uses 1448 bytes for each packet in a FILE traffic flow. On the other hand, packet size in AUDIO or VIDEO traffic flow may be smaller. By examining Skype, MSN, and GTalk, it may be observed that VoIP packet size is nominally from 50 bytes to 200 bytes, and video conference packet size is nominally from 50 bytes to 600 bytes. Therefore, based on the description above, packet size in a network traffic flow may be used as criteria to separate FILE traffic flow from AUDIO or VIDEO traffic flow within a hybrid flow.

Further as described in U.S. patent application Ser. No. 11/644,419 entitled "Method for Real Time Network Traffic Classification," AUDIO and VIDEO protocols may specify a constant interval between two consecutive packets at the transmission side. This constant interval may be referred to as inter-packet delay (IPD). For example, table I lists several speech codec (coder/decoder) standards and the corresponding specified IPD.

TABLE 1

Commonly used speech codec and their specifications

| Standard | Codec Method | Inter-Packet Delay (ms) |
|---|---|---|
| G.711 [28] | PCM | .125 |
| G.726 [29] | ADPCM | .125 |
| G.728 [30] | LD-CELP | .625 |
| G.729 [31] | CS-ACELP | 10 |
| G.729A [31] | CS-ACELP | 10 |
| G.723.1 [32] | MP-MLQ | 30 |
| G.723.1 [32] | ACELP | 30 |

As shown in FIG. 1, the AUDIO packets (131) include multiple packets separated in the time scale by IPD associated with a corresponding VoIP application. Based on the regularity of the IPD, classification of audio traffic flows may be formulated as a pattern classification problem. In one example, time domain regularity detection may be employed but it is not a straight-forward task. Power spectral density (PSD) features, which contain information in frequency domain is used in the method disclosed in U.S. patent application Ser. No. 11/644,419 entitled "Method for Real Time Network Traffic Classification," which places the PSD feature vectors in a space ℝ of dimensions M. During a training phase, the method extracts training PSD feature vectors from training traffic flows for each pattern category. For example, audio packets of a VoIP application generally form a pattern category characterized by the IDC of the speech codec used by the VoIP application. Multiple training PSD feature vectors extracted from training traffic flows of a VoIP application are typically similar and form a low (i.e., less than M) dimensional subspace structure of training data identifiable from the high dimensional space ℝ. Generally speaking, the high dimensional space ℝ may include multiple subspace structures corresponding to multiple VoIP applications using various speech codecs where each subspace structure is associated with a speech codec having a unique IPD.

During a classification phase, a portion of a network traffic flow (i.e., a collection of packets) may be first represented as a stochastic process as described above. The method may extract PSD feature vectors using a stochastic process model and then make decision by measuring similarities (e.g., based on a normalized distance) between the feature vector of the portion of the network traffic flow being classified and each of the multiple subspace structure in the high dimensional space ℝ. The classification is then determined when at least one of the similarities matches a predefined criterion. Said in other words, when the similarity between the feature vector of the portion of the network traffic flow being classified and a subspace structure corresponding to a VoIP application matches the predefined criterion, the portion of the network traffic flow is classified (or identified) as VoIP activity associated with the VoIP application.

Figure 2:
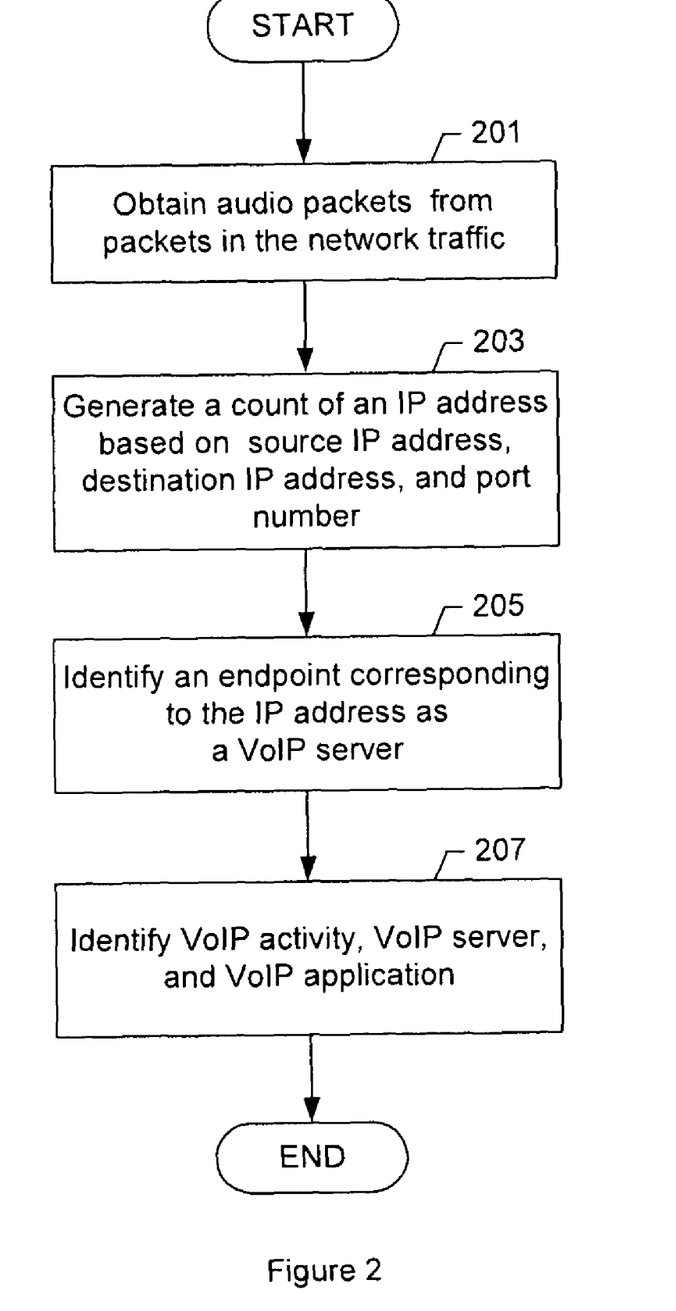
FIGS. 2 and 3 show flow charts for VoIP traffic behavior profiling in accordance with one or more embodiments of the invention.

FIG. 2 shows a flow chart of a method for VoIP traffic behavior profiling in accordance with one or more embodiments of the invention. The method may be applied to network traffic flow depicted in FIG. 1 above. Initially in element (201), a plurality of audio packets (e.g., AUDIO packets (131)) may be obtained from a plurality of packets (e.g., including AUDIO packets (131), FILE packets (132), etc.) in the network traffic by analyzing a plurality of parameter sets (e.g., packet size and packet arrival time) based on a criterion such as described in more detail in U.S. patent application Ser. No. 11/644,419 entitled "Method for Real Time Network Traffic Classification." As described above and in more detail in the above referenced application, the plurality of audio packets is identified (or classified) based on a PSD feature vector meeting a similarity criterion when compared to a training PSD feature vector (or a subspace containing the training PSD feature vector) obtained from training packets related to a VoIP application. Since the similarity measure is based on pattern matching dependent upon speech codec parameters, the identified codec may be associated with a VoIP application if the underlying speech codec is used exclusively by the VoIP application. Otherwise, if more than one VoIP application uses the same speech codec, the exact VoIP application generating the identified audio packets may not be uniquely identified.

In element (203), a count of an IP address is generated by counting at least a portion of the plurality of audio packets. In one embodiment of the invention, each packet of the portion of the plurality of audio packets has the IP address as source IP address. In one embodiment of the invention, each packet of the portion of the plurality of audio packets has the IP address as destination IP address. In one embodiment of the invention, each packet of the portion of the plurality of audio packets has the IP address as either source IP address or destination IP address. In one embodiment of the invention, each packet of the portion of the plurality of audio packets has a port number matching a predefined port number used in a VoIP application.

In element (205), an endpoint corresponding to the IP address is identified as a VoIP server when the count exceeds a pre-determined threshold. Generally speaking, an endpoint is a device in the network identified by an IP address. For example, the endpoint is identified as a VoIP server when the number of audio packets, having (i) the endpoint IP address as the source IP address and (ii) a predefined port number as the source port number, exceeds a first threshold and at the same time when the number of audio packets, having (iii) the endpoint IP address as the destination IP address and (iv) the predefined port number as the destination port number, exceeds a second threshold. In one embodiment of the invention, the pre-determined threshold may be determined empirically or heuristically based on the total number of packets in the plurality of audio packets. In one embodiment of the invention, more than one VoIP servers may be identified from the plurality of audio packets. In one embodiment of the invention, the pre-determined threshold may be adjusted based on probability of false identifications after multiple VoIP servers are identified from one or more plurality of audio packets. For example, no VoIP server may be identified to be associated with peer-to-peer based VoIP activity.

In element (207), the portion of the plurality of audio packets is identified as VoIP activity associated with the VoIP server identified in element (205) above. As described above, the VoIP application used by the VoIP server to generate the VoIP activity may also be identified from the reference PSD feature vector if the reference PSD feature vector is related to a speech codec exclusively used by the VoIP application. Otherwise the method described in U.S. patent application Ser. No. 12/104,723 entitled "System and Method for Internet Endpoint Profiling" may be used to identify the VoIP application. For example in the method, the IP address of VoIP server identified in element (205) may be inputted as a search phrase to an Internet search engine. The method further identifies a key phrase by matching the search result of the search engine to a pre-determined key phrase list obtained using a list of seed IP addresses. The key phrase list is generated during a learning period when a profiling rule is also generated that maps the key phrases in the key phrase list to IP tags or URL classes that include various VoIP applications. Accordingly, the VoIP server and the VoIP activity may then be associated with one of the various VoIP applications.

Figure 3:
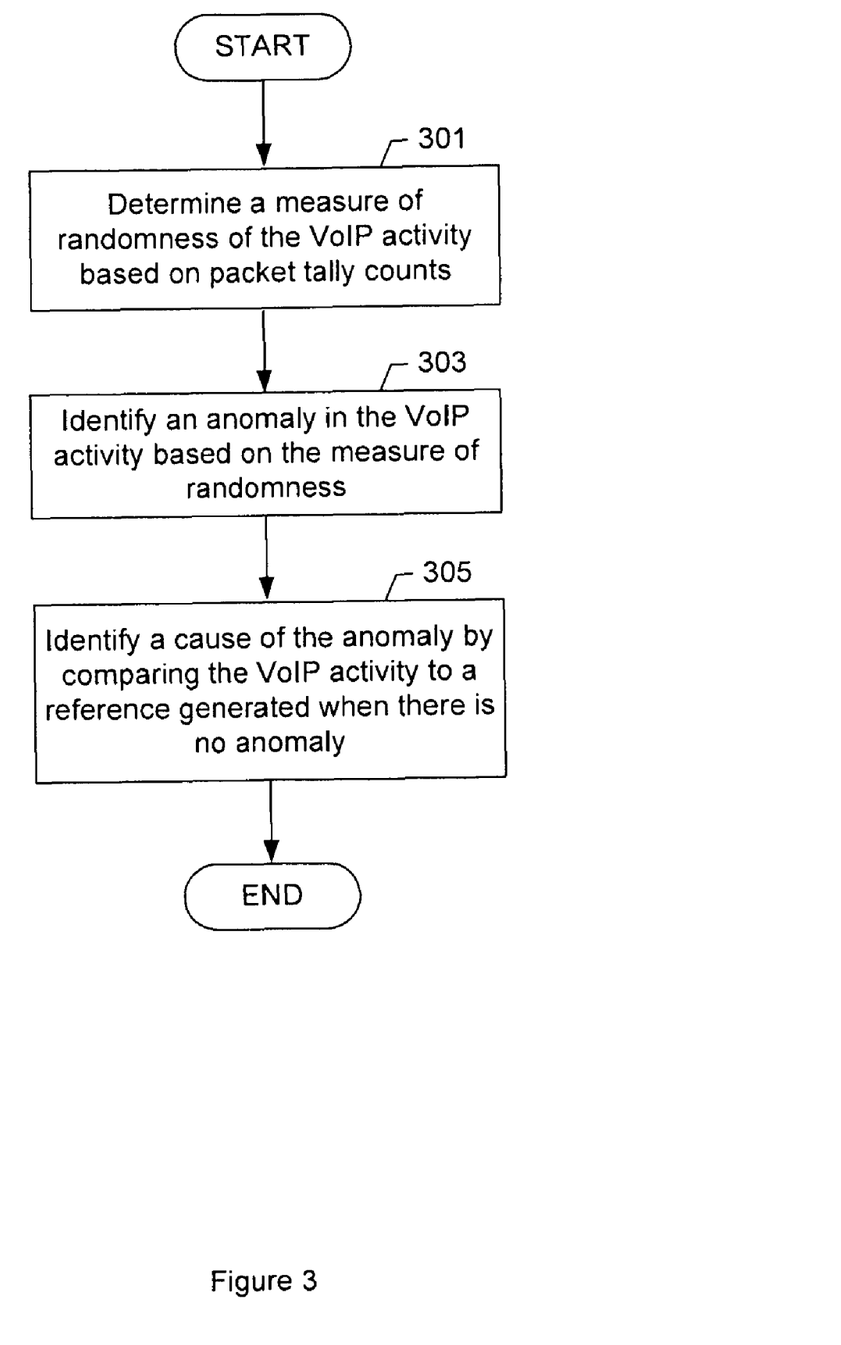

Once the IP addresses associated with the VoIP servers are identified, the behavior of VoIP network traffic may be characterized and profiled by examining the packets (e.g., standard layer-3 (IP) and/or layer-4 (TCP/UDP) header information) going through them. FIG. 3 shows a flow chart of such a method for VoIP traffic behavior profiling in accordance with one or more embodiments of the invention. Initially in element (301) the VoIP activity associated with the VoIP server is tallied according to a plurality of distinct user identifiers to produce a plurality of packet tally counts.

In one embodiment of the invention, the plurality of distinct user identifiers include distinct destination IP addresses obtained by examining packets of the VoIP activity that has the VoIP server IP address as the source IP address. Histograms of packet counts versus these distinct user identifiers may then be included in the plurality of packet tally counts.

In one embodiment of the invention, the plurality of distinct user identifiers include distinct source IP addresses obtained by examining packets of the VoIP activity that has the VoIP server IP address as the destination IP address. Histograms of packet counts versus these distinct user identifiers may then be included in the plurality of packet tally counts.

In element (303), a measure of randomness of the VoIP activity (or more specifically user activity of the VoIP activity) is determined based on the plurality of packet tally counts produced in element (301) above. For example, the number of unique user identifiers seen in the source IP address and destination IP address fields is counted, and an aggregate user activity diversity (UAD) metric is computed from the distribution of such data over a time period (T). This UAD metric is computed as follows: Let m be the total number of packets in the VoIP activity over T, and n is the total number of distinct user identifiers seen in the packets. For each unique user i, $m_i$ is the number of packets with i in either the source IP address field or the destination IP address field of the packets. Then $p_i = m_i/m$ is the frequency that user i is seen in the packets. The user activity diversity metric, UAD, is then given by the following equation:

$$UAD := \left(-\sum_i p_i \log p_i\right) \Big/ \log m \in [0, 1]$$

where the numerator is the entropy of a histogram P={$p_i$}, while the log m is its maximum entropy—the ratio of the two is the standardized (or normalized) entropy or relative uncertainty (RU). UAD thus provides a measure of "randomness" of user activities as captured by the distribution {$p_i$}: for n>>1, if UAD approximately equals 0, a few users dominate the VoIP activities (in other words, they appear in most of the packets), whereas UAD approximately equals 1 implies that p, is on the order of 1/m and thus each user only appears in a few number of packets (hence overall the user activities appear random).

In element (305), an anomaly in the VoIP activity is identified based on the measure of randomness. Generally speaking, sudden changes or deviations from expected behavior reflected in the measure of randomness described above may signify anomalies. Example algorithms for detecting anomalies based on the measure of randomness described (e.g., with respect to FIGS. 13 and 14) in U.S. patent application Ser. No. 11/540,893 entitled "SIP-based'VoIP Traffic Behavior Profiling Method" may be adapted to detect the anomaly in VoIP activities where the feature function in these algorithms represents the UAD described in element (303) above.

Figure 4:
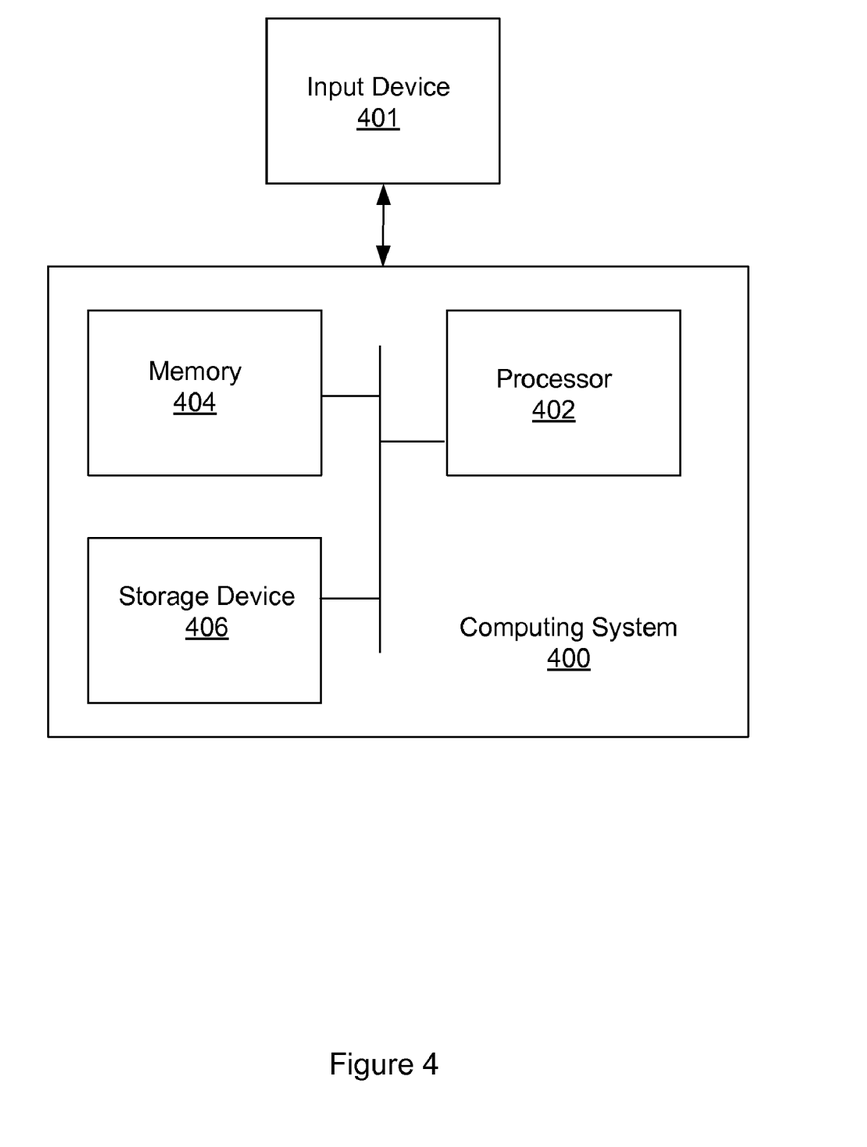
FIG. 4 shows a schematic block diagram of a system in accordance with one embodiment of the invention.

Portions or all of the invention (e.g., one or more module with functionality to implement any of the elements in FIG. 2 and/or FIG. 3 above) may be implemented based on various scheme, such as hardware circuit, processor executing imbedded micro-code or firmware, software, or combinations thereof. For example, the invention may be implemented on virtually any type of computing resource regardless of the platform being used. For example, as shown in FIG. 4, a computing system (400) includes a processor (402), associated memory (404), a storage device (406), and numerous other elements and functionalities typical of today's computing system (not shown). The computing system (400) may also include input means, such as image sensor (401), a keyboard/mouse (not shown), and output means, such as a display monitor (not shown). Those skilled in the art will appreciate that these input and output means may take other forms.

It will be understood from the foregoing description that various modifications and changes may be made in the preferred and alternative embodiments of the invention without departing from its true spirit. This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

We claim:

1. A method for profiling VoIP activity in network traffic, comprising:
   obtaining a plurality of audio packets from a plurality of packets in the network traffic by analyzing a plurality of parameter sets based on a first pre-determined criterion, wherein each of the plurality of parameter sets corresponds to a packet of the plurality of packets and comprises a packet size and a packet arrival time associated with a corresponding packet of the plurality of packets;
   generating a count of an IP address by counting at least a portion of the plurality of audio packets, wherein each packet of the portion of the plurality of audio packets comprises the IP address; and
   identifying an endpoint corresponding to the IP address as a VoIP server and identifying the portion of the plurality of audio packets as VoIP activity associated with the VoIP server when the count exceeds a pre-determined threshold.

2. The method of claim 1 wherein the IP address is a source IP address of each packet of the portion of the plurality of audio packets.

3. The method of claim 1 wherein the IP address is a destination IP address of each packet of the portion of the plurality of audio packets.

4. The method of claim 1 wherein each packet of the portion of the plurality of audio packets comprises a pre-determined port number.

5. The method of claim 1 further comprising:
   obtaining a search result by inputting the IP address as a search phrase to an Internet search engine;
   identifying a key phrase by matching the search result to a pre-determined key phrase list;
   identifying a VoIP application using the key phase according to a pre-determined rule; and
   associating the VoIP server with the VoIP application.

6. The method of claim 1 wherein identifying the plurality of audio packets from the plurality of packets in the network traffic comprises:
   representing the plurality of packets in the network traffic by a stochastic process model comprising the plurality of parameter sets;
   extracting a power spectral density (PSD) feature vector from the plurality of parameter sets according to spectral analysis of the stochastic process model, wherein the PSD feature vector is associated with a portion of the plurality of packets in the network traffic;
   measuring similarity of the PSD feature vector and a pre-determined training PSD feature vector according to a similarity metric; and
   identifying the portion of the plurality of packets in the network traffic as the plurality of audio packets when the similarity matches the first pre-determined criterion.

7. The method of claim 6 wherein identifying the plurality of audio packets from the plurality of packets in the network traffic further comprises:
   obtaining a plurality of training packets associated with a VoIP application;
   representing the plurality of training packets by a training stochastic process model;
   extracting a training PSD feature vector associated with the VoIP application from parameters of the plurality of training packets according to spectral analysis of the training stochastic process model;
   including the training PSD feature vector as the pre-determined training PSD feature vector in a feature vector space.

8. The method of claim 6 further comprises:
   associating the VoIP server with the VoIP application when the similarity of the PSD feature vector and the pre-determined feature vector space matches the first pre-determined criterion.

9. The method of claim 1 further comprises:
   tallying the VoIP activity associated with the VoIP server according to a plurality of distinct user identifier to produce a plurality of packet tally counts;
   determining a measure of randomness of the VoIP activity based on the plurality of packet tally counts; and identifying an anomaly in the VoIP activity based on the measure of randomness.

10. The method of claim 9,
wherein the IP address is a source IP address of each packet of the portion of the plurality of audio packets, and
wherein the plurality of distinct user identifiers comprise one or more distinct destination IP address of the portion of the plurality of audio packets.

11. The method of claim 9,
wherein the IP address is a destination IP address of each packet of the portion of the plurality of audio packets, and
wherein the plurality of distinct user identifiers comprise one or more distinct source IP address of the portion of the plurality of audio packets.

12. The method of claim 9 wherein determining the measure of randomness is according to a user activity diversity (UAD) metric.

13. The method of claim 9 wherein identifying the anomaly based on the measure of randomness comprises:
determining a rate of change by comparing the measure of randomness to a previously determined measure of randomness within a pre-determined time period;
determining a deviation from norm by comparing the rate of change to a moving average of the rate of change;
comparing the deviation from norm to a previously determined deviation from norm to generate a comparison result, wherein the previously determined deviation from norm is determined in a learning period, and
identifying the anomaly when the comparison result matches a second pre-determined criterion.

14. The method of claim 9 wherein identifying the anomaly comprises:
calculating a first parameter representing a rate of change based on the measure of randomness,
calculating a second parameter representing an instantaneous deviation from a moving average of the first parameter;
incrementing an alert level and locking the first parameter if the second parameter is greater than a first threshold, wherein the first threshold is based on a maximum of the second parameter in a learning period prior to identifying the anomaly;
decrementing the alert level if the second parameter is lower than a second threshold;
unlocking the first parameter if the alert level is lower than a third threshold; and
identifying the anomaly when the alert level is greater than a fourth threshold.

15. The method of claim 14 further comprising:
adjusting the third threshold or the fourth threshold if the identified anomaly is a false anomaly.

16. The method of claim 9 further comprising:
generating a reference based on another VoIP activity associated with the VoIP server when no anomaly is identified;
comparing the VoIP activity to the reference to generate a comparison when the anomaly is identified; and
identifying a cause of the anomaly based on the comparison.

17. The method of claim 16,
wherein the reference comprises a histogram of the another VoIP activity when no anomaly is identified,
wherein a current histogram is a histogram of the VoIP activity when the anomaly is identified, and
wherein the comparison is a plurality of elements contributing to a relative entropy of the current histogram with respect to the reference.

18. A non-transitory computer readable medium, embodying instructions executable by the computer to perform method steps for profiling VoIP activity in network traffic, the instructions comprising functionality for:
obtaining a plurality of audio packets from a plurality of packets in the network traffic by analyzing a plurality of parameter sets based on a first pre-determined criterion, wherein each of the plurality of parameter sets corresponds to a packet of the plurality of packets and comprises a packet size and a packet arrival time associated with a corresponding packet of the plurality of packets;
generating a count of an IP address by counting at least a portion of the plurality of audio packets, wherein each packet of the portion of the plurality of audio packets comprises the IP address; and
identifying an endpoint corresponding to the IP address as a VoIP server and identifying the portion of the plurality of audio packets as VoIP activity associated with the VoIP server when the count exceeds a pre-determined threshold.

19. The non-transitory computer readable medium of claim 18 wherein the IP address is a source IP address of each packet of the portion of the plurality of audio packets.

20. The non-transitory computer readable medium of claim 18 wherein the IP address is a destination IP address of each packet of the portion of the plurality of audio packets.

21. The non-transitory computer readable medium of claim 18 wherein each packet of the portion of the plurality of audio packets comprises a pre-determined port number.

22. The non-transitory computer readable medium of claim 18 the instructions further comprising functionality for:
obtaining a search result by inputting the IP address as a search phrase to an Internet search engine;
identifying a key phrase by matching the search result to a pre-determined key phrase list;
identifying a VoIP application using the key phase according to a pre-determined rule; and
associating the VoIP server with the VoIP application.

23. The non-transitory computer readable medium of claim 18 wherein identifying the plurality of audio packets from the plurality of packets in the network traffic comprises:
representing the plurality of packets in the network traffic by a stochastic process model comprising the plurality of parameter sets;
extracting a power spectral density (PSD) feature vector from the plurality of parameter sets according to spectral analysis of the stochastic process model, wherein the PSD feature vector is associated with a portion of the plurality of packets in the network traffic;
measuring similarity of the PSD feature vector and a pre-determined training PSD feature vector according to a similarity metric; and
identifying the portion of the plurality of packets in the network traffic as the plurality of audio packets when the similarity matches the first pre-determined criterion.

24. The non-transitory computer readable medium of claim 23 wherein identifying the plurality of audio packets from the plurality of packets in the network traffic further comprises:
obtaining a plurality of training packets associated with a VoIP application;
representing the plurality of training packets by a training stochastic process model;
extracting a training PSD feature vector associated with the VoIP application from parameters of the plurality of training packets according to spectral analysis of the training stochastic process model;

including the training PSD feature vector as the pre-determined training PSD feature vector in a feature vector space.

25. The non-transitory computer readable medium of claim 23 further comprises:

associating the VoIP server with the VoIP application when the similarity of the PSD feature vector and the pre-determined feature vector space matches the first pre-determined criterion.

26. The non-transitory computer readable medium of claim 18 the instructions further comprising functionality for:

tallying the VoIP activity associated with the VoIP server according to a plurality of distinct user identifier to produce a plurality of packet tally counts;

determining a measure of randomness of the VoIP activity based on the plurality of packet tally counts; and identifying an anomaly in the VoIP activity based on the measure of randomness.

27. The non-transitory computer readable medium of claim 26, wherein the IP address is a source IP address of each packet of the portion of the plurality of audio packets, and wherein the plurality of distinct user identifiers comprise one or more distinct destination IP address of the portion of the plurality of audio packets.

28. The non-transitory computer readable medium of claim 26, wherein the IP address is a destination IP address of each packet of the portion of the plurality of audio packets, and wherein the plurality of distinct user identifiers comprise one or more distinct source IP address of the portion of the plurality of audio packets.

29. The non-transitory computer readable medium of claim 26, wherein determining the measure of randomness is according to a user activity diversity (UAD) metric.

30. The non-transitory computer readable medium of claim 26, wherein identifying the anomaly based on the measure of randomness comprises:

determining a rate of change by comparing the measure of randomness to a previously determined measure of randomness within a pre-determined time period;

determining a deviation from norm by comparing the rate of change to a moving average of the rate of change;

comparing the deviation from norm to a previously determined deviation from norm to generate a comparison result, wherein the previously determined deviation from norm is determined in a learning period, and identifying the anomaly when the comparison result matches a second pre-determined criterion.

31. The non-transitory computer readable medium of claim 26, wherein identifying the anomaly comprises:

calculating a first parameter representing a rate of change based on the measure of randomness, calculating a second parameter representing an instantaneous deviation from a moving average of the first parameter;

incrementing an alert level and locking the first parameter if the second parameter is greater than a first threshold, wherein the first threshold is based on a maximum of the second parameter in a learning period prior to identifying the anomaly;

decrementing the alert level if the second parameter is lower than a second threshold;

unlocking the first parameter if the alert level is lower than a third threshold; and identifying the anomaly when the alert level is greater than a fourth threshold.

32. The non-transitory computer readable medium of claim 31, the instructions further comprising functionality for:

adjusting the third threshold or the fourth threshold if the identified anomaly is a false anomaly.

33. The non-transitory computer readable medium of claim 26, the instructions further comprising functionality for:

generating a reference based on another VoIP activity associated with the VoIP server when no anomaly is identified;

comparing the VoIP activity to the reference to generate a comparison when the anomaly is identified; and identifying a cause of the anomaly based on the comparison.

34. The computer readable medium of claim 33, the instructions further comprising functionality for:

wherein the reference comprises a histogram of the another VoIP activity when no anomaly is identified, wherein a current histogram is a histogram of the VoIP activity when the anomaly is identified, and wherein the comparison is a plurality of elements contributing to a relative entropy of the current histogram with respect to the reference.

* * * * *